Feb. 24, 1959 B. C. GANTER 2,874,821
FEEDING MECHANISM
Filed Aug. 17, 1954 4 Sheets-Sheet 2

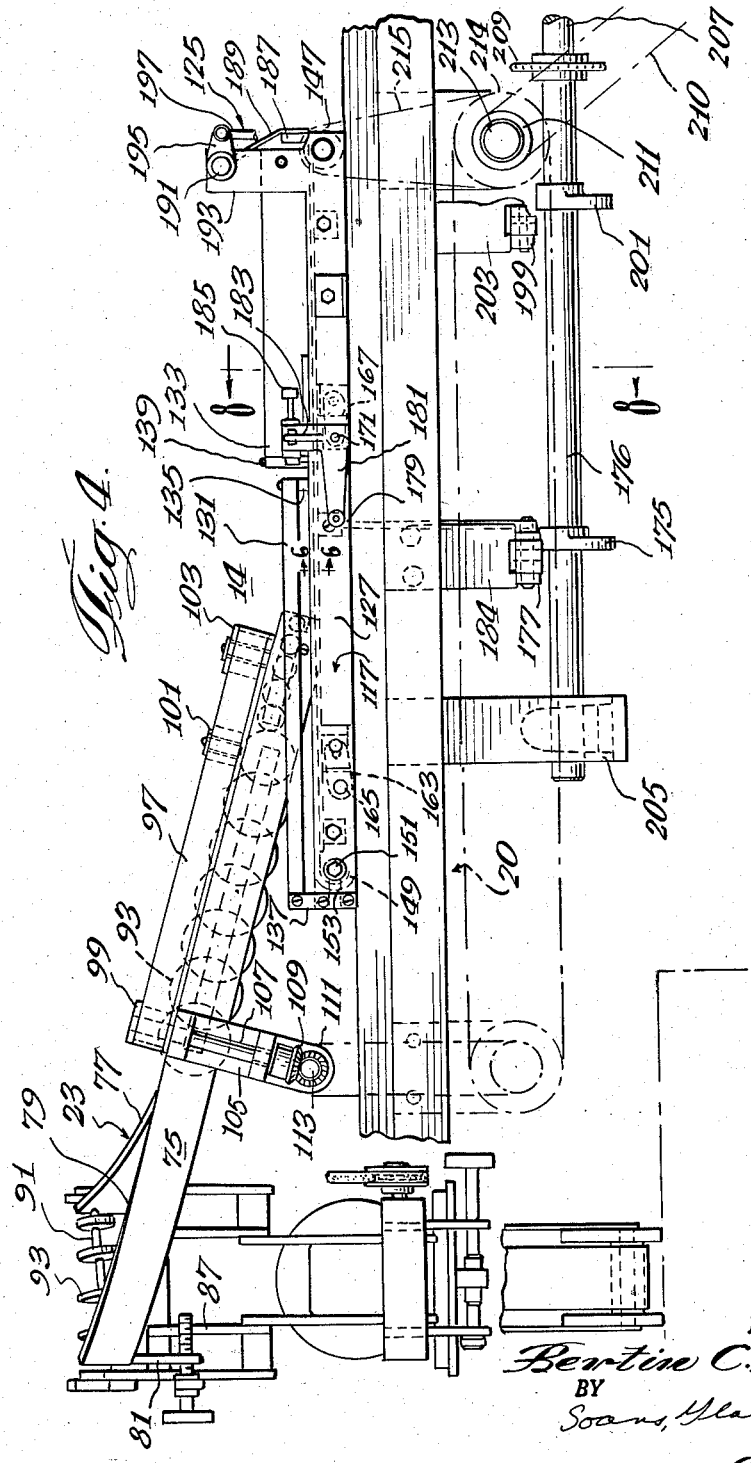

United States Patent Office 2,874,821
Patented Feb. 24, 1959

2,874,821

FEEDING MECHANISM

Bertin C. Ganter, Dallas, Tex., assignor to Kraft Foods Company, Chicago, Ill., a corporation of Delaware Application August 17, 1954, Serial No. 450,494

4 Claims. (Cl. 198—34)

This invention relates generally to apparatus for automatically feeding materials at selected times and, more particularly, it relates to apparatus for feeding sticky products, such as cheese, to a packaging machine in indexed relation.

Today, many products are manufactured and packaged on separate machines. In this connection, the manufacturing machine usually discharges a finished product onto a belt or conveyor whereupon it is conveyed to a packaging machine. One such manufacturing machine is the apparatus for making sliced cheese, which apparatus is generally described in Kraft Patent Number 2,352,210 which was issued on June 27, 1944. This machine manufactures sliced cheese in generally rectangular blocks, which cheese must then be packaged.

There are various standard packaging machines and one which is generally used for wrapping cheese is known as the Hudson-Sharpe machine, Model No. 2W8. This machine must be fed at particular times, that is to say, the blocks of cheese must be introduced into the machine in indexed relation. In this connection, the machine is provided with a chain belt having uniformly spaced pawls disposed thereon for picking up the cheese and feeding it to the machine and the blocks of cheese must be deposited, one at a time, between these pawls.

Because of the somewhat sticky character of cheese, it has been necessary, prior to this invention, to manually feed the packaging machines and such feeding is, of course, uneconomical and not too satisfactory. In this connection, available feeding mechanisms have been incapable of handling such products.

The main object of this invention is to provide a feeding mechanism for packaging machines which must be fed in indexed relation or at selected times.

A further object of this invention is the provision of a feeding mechanism particularly adapted for handling sticky products, such as cheese, and feeding such products to a packaging machine in indexed relation.

The various features of this invention are illustrated in the accompanying drawings, in which:

Figure 4 is a side view of the feeding mechanism, that portion of the mechanism being shown which receives the product from the pick-up unit, the view being taken along line 4—4 in Figure 2.

Figure 6 is a cross-sectional view taken along line 6—6 in Figure 4, the view showing the relation between the product and the feeding mechanism during one part of the operation.

Figure 7 is a view similar to Figure 6, this view illustrating the relation during another part of the operation.

Figure 8 is a view taken along line 8—8 in Figure 4.

Figure 1:
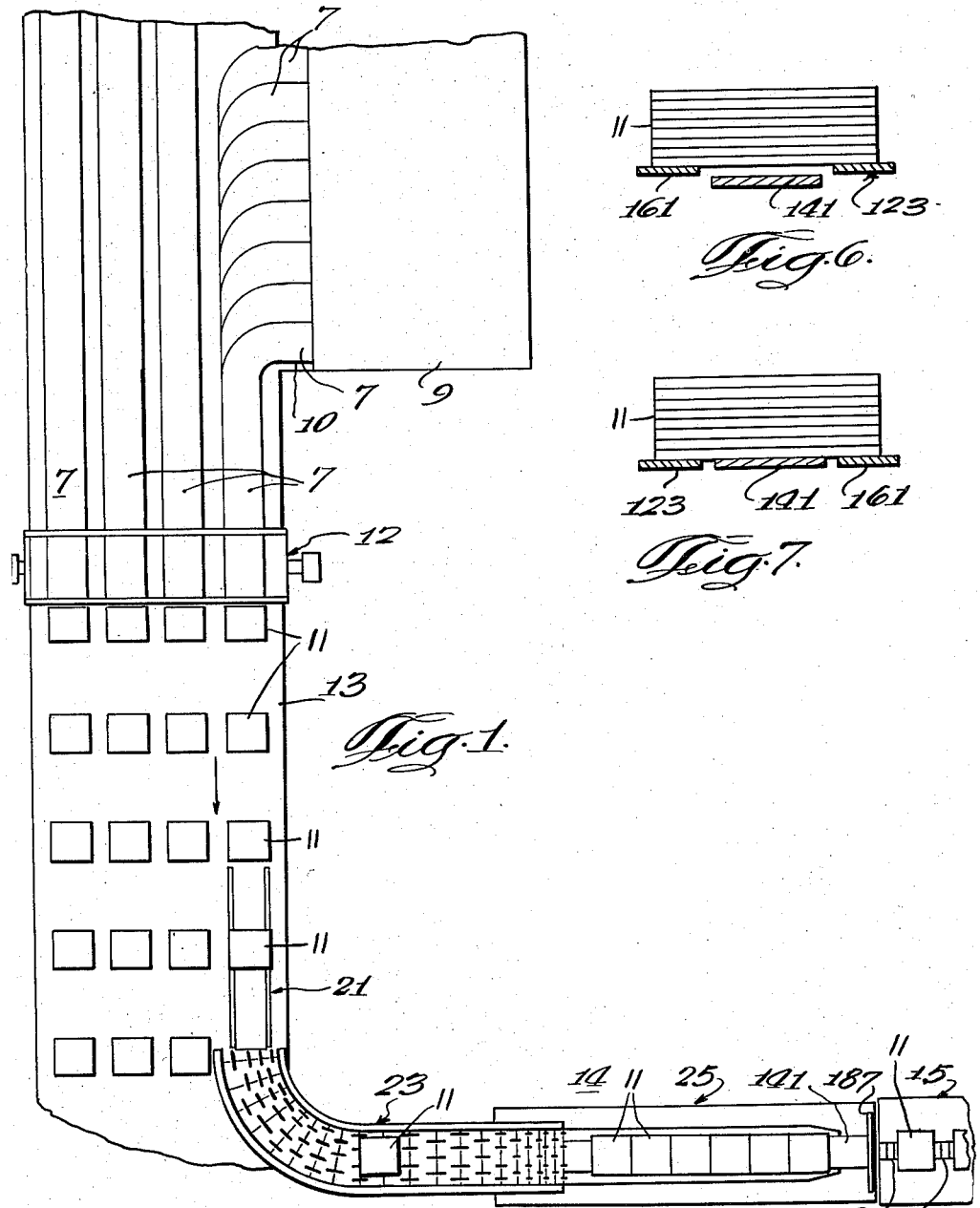
Figure 1 is a fragmentary plan view schematically showing apparatus of the invention in conjunction with machines for manufacturing and packaging cheese.

As above indicated, the feeding mechanism of the invention is adapted for use in conjunction with a packaging machine and a machine for continuously manufacturing a product to be packaged. For purposes of illustration, the drawings show a machine for manufacturing sliced cheese into portions which are generally block shape. These portions are manufactured from continuous ribbons of sliced cheese 7 which are taken from a roll 9 over another roll 10. A detailed description of this machine is set forth in the Kraft patent, Number 2,352,210, above referred to.

The ribbons 7 are automatically cut into half pound portions or blocks 11 by a cutting mechanism 12 and spaced along a conveyor belt 13. In an actual commercial operation, four rows of blocks of cheese are disposed on the conveyor belt 13 for feeding successive packaging machines. In the drawings, only one packaging machine is generally shown and, likewise, only one feeding mechanism is shown.

The conveyor 13 feeds the blocks of cheese 11 into the feed mechanism of the invention, designated generally as 14, and the feeding mechanism discharges into a packaging machine 15, the product being discharged from the feeding mechanism into the packaging machine in proper indexed relation. The packaging machine 15 is of conventional type and includes a continuous chain 17 on which are disposed a series of longitudinally spaced pawls 19 which pick up the blocks 11 discharged from the feed mechanism 14 and feed them into the packaging machine 15.

The feeding mechanism 14 of the invention comprises a main frame 20, and a pick-up unit 21 which picks up the cheese blocks from the belt 13. The pick-up unit discharges the blocks to a roller unit 23 which carries the cheese from the pick-up unit to a feeder 25 which, in turn, discharges the blocks into the packaging machine 15.

The pick-up unit 21 is in-line with the conveyor belt 13 and the roller unit 23 turns the cheese ninety degrees and drops it into the feeder 25 which is in line with the packaging machine 15. As a result, a series of feeding mechanisms 14 may be placed at longitudinally spaced points to pick up these blocks from transversely spaced rows.

The pick-up unit 21 comprises an inclined conveyor 27 which includes an inclined, channel shaped member 29 and a conveyor belt 31 which rides over the top of this member. The conveyor belt 31 is driven by means of a pulley 33, at its upper end, and travels over an idler pulley 35 at its lower end. The idler pulley 35 is journalled on the channel member 29 adjacent its lower end and the driving pulley is journalled in arms 36 connected to and extending from the upper end of the channel member.

The upper end of the channel member 29 is carried on vertically adjustable brackets 41, one bracket being attached to each of the arms 36. The brackets 41 are attached to a sub-frame 43, this frame being supported on the main frame 20. The bracket 41 is vertically adjustable so that the pick-up unit may be raised or lowered for effecting satisfactory feed to the roller unit 23 and for tilting this unit the desired amount to cause the desired feed to the feeder 25. Each bracket 41 includes a plate member 45 in which are disposed a pair of vertically extending and alined slots 47 and 49, respectively. The plates are attached to the sub-frame 43 by means of bolts 51 and 53 which extend through slots 47 and 49, respectively. By loosening the bolts 51 and 53 the plate 45 may be raised or lowered. The similar arrangements on opposite sides of the conveyor 27 permit the upper end of the pick-up unit to be uniformly adjusted.

The drive pulley 33 for the conveyor belt 31 is mounted on a shaft 55 to which is keyed a sheave 57. The sheave is rotated by a V-belt 59 which is driven by a motor 61. The belt 59 is guided over a tensioning sheave 62 which is supported upon the sub-frame 43 and is adjusted when the pick-up unit is raised or lowered to provide proper tensioning on the belt.

For the purpose of picking up the cheese blocks from the conveyor belt 13, the lower end of the pick-up arm is provided with pick-up fingers 65 and 67. These fingers are bolted to the channel member 29, over which the conveyor belt 31 rides, by means of bolts 69. Attached to the channel member 29 is a stabilizer 71 by means of which the blocks of cheese being pushed up onto conveyor belt 31 will maintain an even pressure on belt 31 and not have a tendency to twist out of position. The stabilizer 71 comprises a blade 71a which is mounted on an arm 71b. The arm is journalled on the channel member 29 and is biased to effect pressure on the cheese picked up from the conveyor 13. The blade 71a is fabricated from a material which will not stick to the product picked up and, in the case of picking up cheese, it is made of tetrafluoroethylene polymer.

The pick-up fingers 65 and 67 shown in the drawings are generally tear-drop in shape and are formed of a material which will not stick to cheese. This material is preferably a tetrafluoroethylene polymer and is commercially available under the trade name Teflon. I have found that stainless steel may also be used for the fingers. The particular configuration of the fingers is important in order to effect satisfactory pick up of the cheese. Each finger comes to a point which is slightly directed toward the belt 13 carrying cheese blocks from the cutting unit 12 and the points ride upon the belt, slightly impressing the belt. The pick up of sticky products from a continuous belt was one of the serious problems encountered in providing a satisfactory feeding mechanism. I discovered, however, that this could be done by the use of the pick-up fingers described in combination with a belt made of neoprene.

Figure 2:
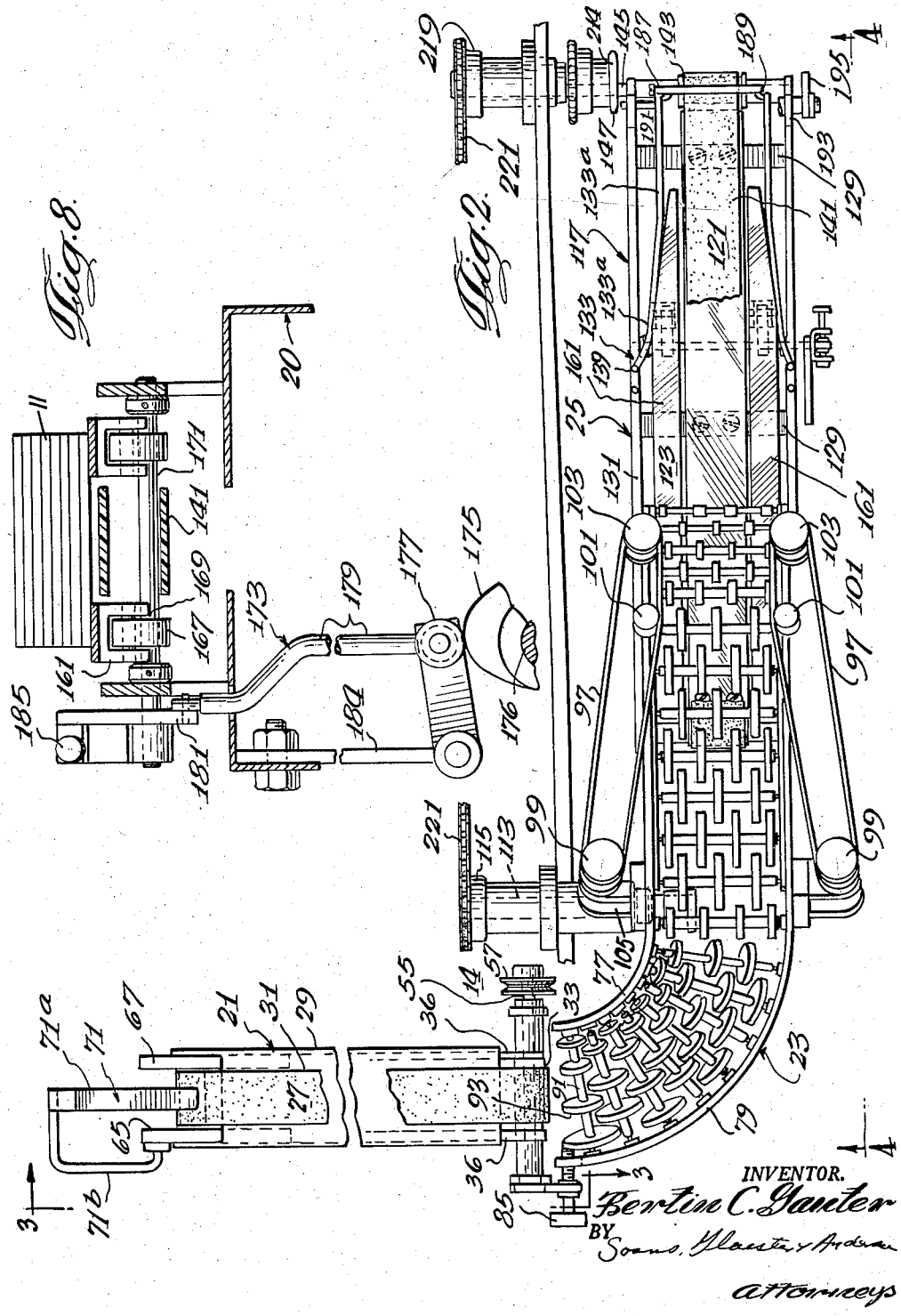
Figure 2 is a plan view of the feeding mechanism of the invention.
Figure 3:
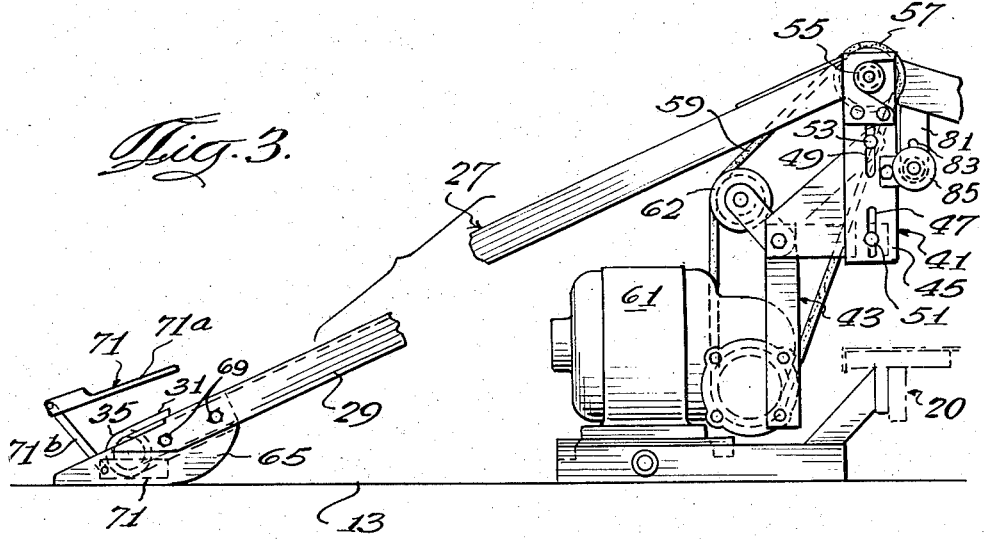
Figure 3 is a fragmentary side view of a pick-up unit which, in the illustrated embodiment, comprises a part of the feeding mechanism and which is adapted to pick up materials from a moving belt and convey them upwardly, this view being taken along line 3—3 in Figure 2.

The roller unit 23 tilts downwardly from the pick-up unit and is adjustably supported by the plate member 45 of the pick-up unit 21 at its upper end, the feeder 25 supporting the lower end. The roller unit 23 comprises a frame 75 which includes a pair of laterally spaced sections 77 and 79. These sections are shaped to provide a ninety degree turn, as shown in Figure 2, and are spaced apart a distance which is somewhat wider than the block which is to be handled. The section 79, at its upper end, is connected to a vertically extending bracket 81 which is provided with a slot 83 and an adjusting screw 85 extends through the slot 83, the screw threadedly engaging a bracket 87 which is bolted to the plate 45 of the pick-up unit. Thus it will be seen that the upper end of the roller unit 23 may be moved concurrently with the upper end of the pick-up unit 21 or, alternatively, it may be moved relative to the pick-up unit.

Journalled on the roller frame 75 are a plurality of shafts 91 on which are mounted wheels 93. These wheels are made of a material which will not stick to cheese and are preferably made of tetrafluoroethylene polymer. The wheels 93 which are disposed on the curve of the frame 75 are of such diameter as to assure conducting of the cheese material around the turn. In this connection, the wheels 93 on the inside of the turn are smaller than the wheels on the outside of the turn so that while the rotational speed of the wheels is the same, the peripheral speed of the inside wheels is less than the outside wheels, thereby causing the blocks to be conducted around the turn. As shown in Figure 4, the supporting portions of the wheels are level so that the shafts 91 are inclined.

The wheels adjacent the bottom of the roller frame 75 are of reduced diameter for conducting the cheese onto the feeder 25. Such reduction in diameter is necessary to assure a smooth transfer of the blocks from the roller unit 23 to the feeder 25 without excessive drop off.

In order to effect aligned feeding of the cheese blocks into the feeder, guide belts 97 are disposed on opposite sides of the roller frame 75. Each guide belt 97 is driven by a pulley 99 and travels over an idler pulley 101 and around a second idler pulley 103. The idler pulleys 101 and 103 on each side of the roller unit 23 are journalled on the roller frame 75. The drive pulleys 99 are carried on brackets 105 which are also carried by the roller frame.

The belts 97 converge from the driving pulleys 99 to the idler pulleys 101 and are in parallel relation as they travel from these pulleys to the second idler pulleys 103. The parallel portion of the guide belts are spaced apart a distance such that there is no substantial positive drive on the cheese blocks.

The drive pulleys 99 are mounted on shafts 107 which are driven by miter gears 109 and 111. The gears 111 are keyed to a shaft 113 which is driven by a sprocket 115, the shaft 113 being supported on the roller frame 75 of the roller unit 23.

The feeder 25 receives cheese from the roller unit and, as pointed out, delivers it to the packaging machine 15 in proper indexed relation so as to engage the pawls 17 on the continuous belt on the packaging machine. The feeder includes a frame 117 which supports the various working parts of the unit. The feeder includes an endless belt conveyor 121, lift mechanism 123 and a gate mechanism 125. The conveyor 121, lift mechanism and gate mechanism 125 are in coacting relation, to be more fully described hereinafter, so as to feed the cheese blocks to the packaging machine 15 in proper indexed relation.

The frame 117 of the feeder 25 includes a pair of spaced longitudinally extending members 127 which are held in parallel spaced relation by means of transversely extending members 129 which, in turn, are bolted to the frame 20 of the feeding mechanism 14.

The frame 117 further includes two pairs of longitudinally extending guide members 131 and 133 which are carried by the frame members 127. The guide members 131 are spaced apart a distance which is greater than the width of the blocks fed to the feeder 25 and a distance sufficient to accommodate the lower end of the roller frame 75. Each member 131 comprises a vertically extending plate which is supported at its forward end by a pin 135 and at its rearward end by a post 137, the pin 135 and post 137 being attached to the members 127.

The guide members 133 are located forwardly of the guide members 131 and converge to a width approximating that of the blocks fed to the feeder 25 and, in this connection, each member 133 includes a converging section 133a and a parallel section 133b which is disposed at the forward end. The guide members 133 are supported at their rearward end by means of pins 139 and at their forward ends by suitable brackets (not shown).

The conveyor 121 of the feeder 25 comprises a belt, which is continuously driven, designated 141. The belt, continuously driven, passes over a driving pulley 143 located at the discharge end of the feeder. The pulley is supported on a shaft 145 journalled in the frame 117 of the feeder. The shaft 145 is keyed to a sprocket 147 which is continuously driven by means which will be hereinafter described.

The conveyor belt 141 also passes over a tension pulley 149 which is supported on the frame 117 of the feeder at the opposite end from the discharge pulley 143. The tensioning pulley is supported on a shaft 151 which is carried in a slot 153 in the frame 117. The tensioning pulley may be bolted at a suitable place in the slot 153 to provide the desired tensioning of the belt 141.

The lifting mechanism 123 includes a pair of spaced, horizontally disposed, lift plates 161 which extend longitudinally on each side of the conveyor belt 141. The lift plates are supported on links located adjacent the forward and rearward ends of the plates. The rearward ends of the plates are carried on links 163 which are supported on and keyed to a transversely extending shaft 165, the shaft being journalled in the members 127 of the frame of the feeder 25. Each of the links 163 is connected by means of a pin (not shown) to lift plates 161 adjacent the rearward end thereof.

Adjacent the forward end of the lift plates, a link 167 is connected by a pin 169 to each lift plate 161. The link, at its rearward end, is keyed to a transversely extending shaft 171 which is rotated through an adjacent link mechanism 173 by means of an actuating cam 175. The cam 175 is mounted on a shaft 176 which is driven by the packaging machine 15 at a speed proportional to the operation of the packaging machine.

The adjusting link mechanism 173 includes a cam follower 177 which rides on the cam 175 and which is connected to a vertically extending connecting link 179. The link 179 is connected, in turn, to one end of a crank 181 which, at its other end, is connected to an adjustable link 183. The adjustable link 183 is keyed to the shaft 171 so that the cam 175 rotates this shaft through the linkage 173. The adjustable link 183 is connected to the crank 181 by means of an adjusting screw 185. The adjusting link may be rotated clockwise or counterclockwise by the adjusting screw 185 so as to vary the relative position of the crank 181 and the link 183.

In the illustrated embodiment, the cam follower 177 is pivotally supported on a bracket 184 which is attached to the main frame 20 of the feeding mechanism.

In operation of the lifting mechanism 123, the cam 165 raises and lowers the lift plates 161 through the linkage at preselected times so that the belt 141 can drive the blocks of cheese forward.

The lift plates 161 terminate at a point short of the end of the conveyor belt 141 a distance approximating the length of the block. This is a feature of the invention which assures positive feed of the product to the packaging machine 15. It is important that the lift plates terminate at such a point that the unit to be fed to the packaging machine which is farthest forward in the feeder 25 is positively driven even after the lift plates 161 are raised from the belt (Figure 7) and the next unit is not driven by the belt when the plates are in such position.

The length of the feeder 25 may be varied within rather wide limits and, in this connection, the length of the feeder should be at least long enough to accommodate one unit to be packaged on the lift plates 161 and should be long enough to permit the pick-up unit 21 to be moved out to pick-up blocks from the outside row on the conveyor 13, which movement, of course, moves the roller unit 23 relative to the feeder 25.

As before pointed out, the feeder 25 also includes a gate mechanism 125. The gate mechanism 125 is operable to assure proper feeding of the blocks to the packaging machine 15. This gate mechanism is in a closed position just prior to dropping of the blocks into the conveyor 17 of the packaging machine 15 so that the preceding block is retained on the lift plates 161 and double feeding of the packaging machine 15 is prevented.

The gate mechanism 125 comprises a gate 187 which is located at the discharge end of the feeder so as to effectively stop blocks of cheese from dropping into the packaging machine. The gate is carried on vertically extending arms 189 which are rigidly attached to a transversely extending shaft 191. The shaft 191 is journalled on a pair of transversely spaced supports 193 which are attached to the frame 117 of the feeder 25. Keyed to the shaft is a pivot arm 195 which extends generally horizontally and forwardly. The pivot arm 195, in turn, is connected to a linkage 197 which, at its lower end, is attached to a cam follower 199. This follower rides on a cam 201 which is fixedly attached to the shaft 176 on which is mounted the other cam 175 associated with the lift plates 141. The cam follower 199 is pivotally mounted on a bracket 203 which is attached to the main frame 20 of the feeding mechanism 14. As the cam follower 199 rides up on the cam, the gate 187 is opened thereby permitting a block of cheese to be discharged from the feeder 25.

The feeding mechanism 14 includes three driving or actuating arrangements. As pointed out, the pick-up unit 21 is driven by the motor 61 by means of a belt 59. This is a continuous drive for picking up blocks from the belt 13. The second driving arrangement of the feeding mechanism 14 is provided by the packaging machine 15 which rotates the shaft 176. The shaft is rotated by the packaging machine 15 one revolution for each packaging operation. The shaft 176 is journalled at the rearward end in a bracket 205 which is carried on the main frame 20 of the feeding mechanism 14. The shaft 176, at the forward end, is coupled to a driving shaft 207 which is a part of the packaging machine 15. The coupling may comprise a dual or face to face sprocket arrangement 209 and this arrangement is quite advantageous for indexing the shaft, the teeth of the sprockets being used for this purpose.

The third drive arrangement for the feeding arrangement 14 actuates the belt 141 of the feeder 25 and also operates the guide belts 97 associated with roller unit 23. This driving arrangement comprises a chain 210 which is connected to a sprocket (not shown) on the packaging machine, which sprocket is driven at a speed proportional to the speed of operation of the packaging machines. This chain 210 also connects to a sprocket 211 keyed to a shaft 213 which is journalled in the main frame 20 of the feeding mechanism below the forward end of the feeder 25, in the illustrated embodiment. Also mounted on the shaft 213 is another sprocket 214 which operates the driving pulley 143 of the conveyor 141 which is a part of the feeder 25. This sprocket 214 is connected by a chain 215 to the smaller sprocket 147 mounted on the shaft 145 to which the driving pulley 143 is attached.

For purposes of actuating the guide belts 97 associated with the roller unit 23, a sprocket 219 is attached to the shaft 213. This sprocket drives the sprocket 115 by means of a chain 221. As before pointed out, the sprocket 115 continuously rotates the shaft 113 thereby operating the guide belts 97.

In operation of the feeding mechanism of the invention, blocks of cheese are picked up from the belt 13 by the fingers 65 and 67 of the pick-up unit 21. The blocks are conveyed upwardly by the belt 31 and are discharged onto the roller unit 23. The roller unit, in turn, conducts the block down to the feeder 25 and in the event that the blocks are askew, they are aligned by the guide belts 97. The cheese is dropped on to the feeder 25 at the bottom of the roller unit 23 and is intermittently fed toward the discharge end of the feeder. Such intermittent operation is effected by raising and lowering of the lift plates 161. When the lift plates are lowered, the continuously operating belt 141 carries the cheese forward and when the lift plates are lifted, the blocks are out of contact with the belt and there is no forward feed of the blocks. This is particularly shown in Figures 6 and 7 of the drawings wherein the cheese is shown in contact with the belt 141 in Figure 7 and in the immobile position in Figure 6.

The speed of the belt 141 and the operating cycle of the lift plates 161 are so correlated that during the time of packaging of one unit in the packaging machine 15, one block of cheese is moved a distance approximating its length by the feeder 25. Thus, the blocks are in contact with the belt 141 and the lift plates 161 are lowered for a time sufficient to carry the blocks of cheese forward approximately one length. The forward most block on the feeder is carried by the belt 141 away from the lift plates 161 and up to the discharge gate 187 where it is momentarily held to properly align the block and to prevent double feeding of the packaging machine. The timed relation between the operation of the lift plates and the gate is shown in the graph in Figure 5 of the drawings.

Figure 5:
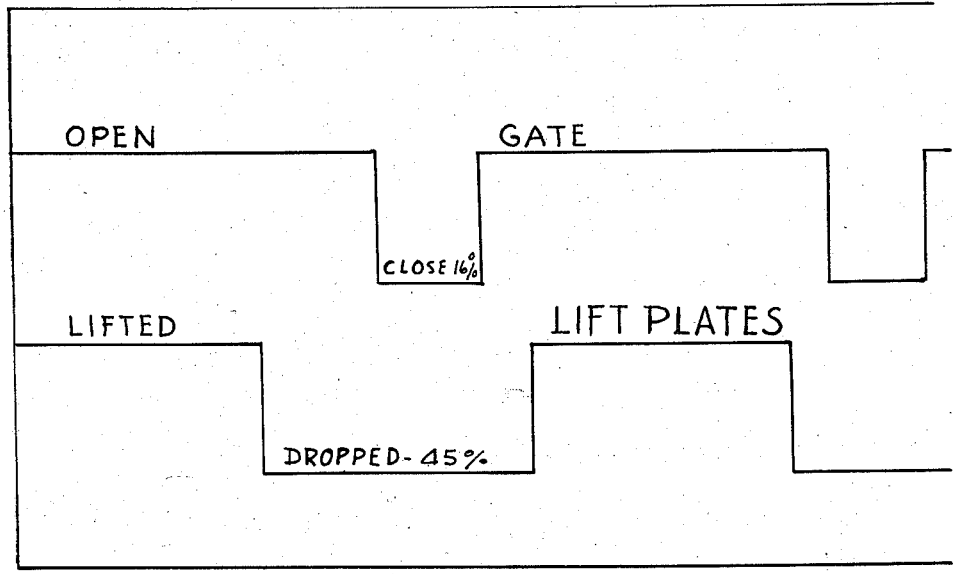
Figure 5 shows the timed relation between the operation of various parts of the apparatus.

It will be seen from the graph in Figure 5 that the gate 187 is closed during the time that the lift plates 161 are dropped, i. e., during the time that the blocks of cheese are moved forward. The gate 187 should open at approximately the time that the block of cheese which is forwardmost in line touches the gate. This will be towards the end of the dropped time of the lift plates 161. The gate need not be closed for an extended time and, in this connection, it is only necessary that it be closed when the blocks are in position to touch the gate.

In a commercial unit, the feeder handles blocks which are between about three and one-quarter to three and three-quarter inches in length and which are normally about three and one-half inches in length. In the course of operation, it is not uncommon for these blocks to vary within one-eighth of an inch from the normal length. The feeder 25 is two feet long and the lift plates 161 terminate at a point about three and one-half inches rearwardly of the gate 187, approximately one block length. The belt 141 is driven at a speed of eight inches per revolution of the shaft 176 which makes one revolution for each block which is packaged during operation of the packaging machine 15. The cam 175 has a raised portion which extends around 165 degrees of the periphery of the cam. On the other hand, the cam 201 has a raised portion which extends around 108 degrees of the circumference of the cam. The cams are so arranged that the gate opens at approximately the same time that the lift plates 161 are raised and, at this time, a block of cheese just touches the gate 187.

In order to effect adjustment for slight variations in the length of the blocks of cheese, the adjusting screw 185 may be operated to somewhat lengthen or shorten the effective time at the raised or lowered position of the lift plates 161.

A particular advantage of the apparatus of the invention is its ability to handle sticky products and deliver them in indexed relation to a packaging machine. Through the use of this apparatus, manual handling of the cheese is almost completely eliminated thereby reducing many packaging difficulties and sliced cheese may be made and packaged without any manual handling.

The various features of the invention which are believed to be new are set forth in the following claims.

I claim:

1. Apparatus for feeding tacky units of variable length in indexed relation comprising, in combination, a lifting means for supporting said products, a continuously operating product moving means extending forwardly of said lifting means at least a distance equivalent to about the length of about one unit, means for moving said lifting means toward and away from said moving means such that a unit engages said moving means and is moved thereby, a gate means disposed adjacent the end of said moving means and positioned to engage a unit on said moving means, and means for opening said gate means at about the time when a unit touches the gate mechanism.

2. Apparatus for feeding tacky units of variable length in indexed relation comprising, in combination, a frame, a pair of horizontally disposed elongated plates on said frame and positioned in parallel and spaced relation, a continuously moving belt adjacent said plates and travelling longitudinally of said plates, means for supporting said belt, means for driving said belt, lifting means connected to said frame and said plates, means for actuating said lifting means, said actuating means being proportioned to lift said plates above said belt and drop said plates below said belt whereby said belt is disengaged and engaged by units on said plates, a gate attached to said frame adjacent the end of said belt means for opening said gate, and timing means for engaging the units with said belt for a time equivalent to that necessary to advance a unit a distance about its length and for actuating said gate opening means when a unit is in the vicinity of said gate.

3. Apparatus for feeding tacky units of variable length in indexed relation comprising, in combination, a frame, a pair of horizontally disposed elongated plates on said frame and positioned in parallel and spaced relation, a continuously moving belt adjacent said plates and travelling longitudinally of said plates, said belt extending forwardly of said plates a distance about equal to the length of one unit, means for supporting said belt, means for driving said belt, lifting means connected to said frame and said plates, means for actuating said lifting means, said actuating means being proportioned to lift said plates above said belt and drop said plates below said belt whereby said belt is disengaged and engaged by units on said plates, a gate attached to said frame adjacent the end of said belt, means for opening said gate, and timing means for engaging the units with said belt for a time equivalent to that necessary to advance a unit a distance about its length and for actuating said gate opening means when a unit is in contact with said gate.

4. Apparatus for feeding tacky units of variable length in indexed relation comprising, in combination, a frame, a pair of horizontally disposed elongated plates on said frame and positioned in parallel and spaced relation, a continuously moving belt disposed between said plates and travelling longitudinally of said plates, said belt extending forwardly of said plates a distance approximating the length of one unit, a pair of spaced pulleys mounted on said frame and within said belt, means for driving one of said pulleys, lifting arms attached to said frame and to said plates, a linkage attached to said plates and said frame, cam means for actuating said linkage, said cam means being proportioned to raise and lower said linkage an amount sufficient to cause units on said plates to disengage and engage said belt, the camming surface being sufficient to cause the unit to be moved its lenth before being removed from said belt, the speed of said belt and the speed of rotation of said cam being in fixed proportion, a gate disposed at the forward end of said belt, supports connected to said gate and connected to said frame, a linkage connected to said gate for opening and closing the gate, a second cam for actuating said gate linkage, the camming surface being arranged to cause said gate to open when a unit touches said gate, the speed of rotation of said second cam being proportional to the speed of rotation of the first cam.

References Cited in the file of this patent

UNITED STATES PATENTS

| | | |
|---|---|---|
| 1,904,613 | Braren | Apr. 18, 1933 |
| 2,141,876 | Perkins | Dec. 27, 1938 |
| 2,237,345 | Frentzel | Apr. 8, 1941 |
| 2,286,603 | Coumbe et al. | June 16, 1942 |
| 2,632,985 | Schmitt | Mar. 31, 1953 |

FOREIGN PATENTS

| | | |
|---|---|---|
| 53,978 | Norway | Dec. 12, 1938 |